United States Patent
Kishi

[11] Patent Number: 5,775,164
[45] Date of Patent: Jul. 7, 1998

[54] REMAINING LIQUID QUANTITY DETECTING DEVICE

[75] Inventor: Motoshi Kishi, Nagoya, Japan

[73] Assignee: Brother Kogyo Kabushiki Kaisha, Nagoya, Japan

[21] Appl. No.: 743,681

[22] Filed: Nov. 6, 1996

[30] Foreign Application Priority Data

Nov. 16, 1995 [JP] Japan .................. 7-323769

[51] Int. Cl.$^6$ .................. G01F 23/24
[52] U.S. Cl. .................. 73/304 R
[58] Field of Search .................. 73/304 R, 304 C; 324/522, 525, 549; 116/227; 340/620

[56] References Cited

U.S. PATENT DOCUMENTS

| | | | |
|---|---|---|---|
| 3,694,804 | 9/1972 | Hill | 73/304 R |
| 4,027,172 | 5/1977 | Hamelink | 73/304 R |
| 4,244,385 | 1/1981 | Hotine | 73/304 R |
| 4,390,793 | 6/1983 | John | 73/304 R |
| 4,610,202 | 9/1986 | Edinuma et al. | 73/304 R |
| 4,903,530 | 2/1990 | Hull | 340/620 |
| 5,255,021 | 10/1993 | Noguchi et al. | 324/548 |

FOREIGN PATENT DOCUMENTS

A-1-304950  12/1989  Japan.

*Primary Examiner*—G. Bradley Bennett
*Attorney, Agent, or Firm*—Oliff & Berridge, PLC

[57] ABSTRACT

A remaining liquid quantity detecting device to detect the quantity of the liquid remaining in a tank by applying a voltage to a pair of electrodes 1 and 2 set in the tank and detecting the electric resistance which will change under the influence of the liquid existing between the electrodes 1 and 2, wherein a standard voltage 10 having a predetermined electric potential is applied to both of the electrodes 1 and 2 at a non-detection time, and one electric potential between the electrodes 1 and 2 is changed so as to alternate on the basis of the standard voltage.

11 Claims, 5 Drawing Sheets

REMAINING LIQUID QUANTITY DETECTING DEVICE

BACKGROUND OF THE INVENTION

1. Field of the Invention

The present invention relates to a remaining liquid quantity detecting device for detecting the quantity of the liquid remaining in a container by means of electrodes set in the container and, more particularly, to a remaining liquid quantity detecting device capable of preventing the occurrence of electrolysis and characteristic deterioration in the liquid which is an object to be detected.

2. Description of Related Art

In conventional ink tanks mounted on a body of an ink jet printer, for example, provided is a remaining liquid quantity detecting device to always detect the quantity of the remaining ink. The detection of the quantity of the remaining ink has been performed by detecting a float with a built-in magnet movable according to a change in the ink liquid level by means of a lead switch and by sensing the ink liquid level by optical sensors. However, the above detecting device has problems of needing complex components and having the proneness to break down, and inconveniences such that accurate detection is disturbed because light can not fully transmit into the container due to the ink adhered to the inner wall surface of the container.

To solve the above inconveniences, there has been proposed a detecting apparatus wherein two electrodes are set in an ink tank so that the heights thereof are made different. The electric resistance between two electrodes generally changes according to whether ink exists therebetween or not.

Accordingly, this apparatus performs detection of ink liquid quantity by measuring the variation in resistance.

Such a remaining liquid detecting apparatus provided with electrodes in an ink tank has an advantage of enabling the precise detection even with a simple structure. However, a direct current passing through the ink would cause the electrolysis of ink and the characteristic deterioration of ink like the change of ink composition. The ink the characteristic of which is deteriorated would therefore have an influence on the performance of ink jetting from an ink jet head at the time of printing. This is not beneficial. In order to restrain the characteristic deterioration of ink including the electrolysis of ink and the like, the application of an alternating current signal has been made to the electrodes in an ink tank.

This application of an alternating current signal to the electrodes could prevent the electrolysis and other problems, but it needs a negative power source to generate an alternating current signal. As a result, there occurs an alternative problem of the detecting apparatus itself becoming expensive. For example, in color jet printers provided with ink tanks each containing an ink in one of four colors; cyan, magenta, yellow, and black, it is necessary to detect the quantity of ink remaining in each of the ink tanks. As the objects to be detected increase, the above problems actually become more important.

In addition, at a present time, a logic circuit is mainly used for a control circuit and the negative power source is hardly used.

SUMMARY OF THE INVENTION

The present invention has been made in view of the above circumstances and has an object to overcome the above problems and to provide an inexpensive remaining liquid quantity detecting device utilizing electrodes and capable of preventing the influence of the electrolysis and the like on the liquid to be detected.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a remaining liquid quantity detecting device of this invention, which is for detecting a quantity of liquid remaining in a tank by applying a voltage to a pair of electrodes arranged in the tank and detecting electrolysis which changes under influence of the liquid existing between the electrodes, the device comprises a first voltage supplying means, connected to the first electrode, for applying a direct-current signal to the first electrode, a switching means, provided in the first voltage supplying means, for switching between a first mode incapable of applying a current-signal to the first electrode and a second mode capable of applying a current-signal to the first electrode, and a second voltage supplying means, connected to the second electrode, for applying a predetermined standard voltage to the first electrode, wherein during a time of non-detecting the quantity of the remaining liquid, the first voltage supplying means is set in the first mode through the switching means and a standard voltage is applied to the first and second electrodes based on the second voltage supplying means, and during a time of detecting the quantity of the remaining liquid, the first voltage supplying means is set in the second mode through the switching means and an electric potential of the first electrode is changed alternatingly on the basis of the standard voltage based on the first and second voltage supplying means.

In the remaining liquid quantity detecting device of the present invention, the direct-current signal may be a square waveform, and preferably the switching means sets the first voltage supplying means in the first mode based on a timing of detecting the remaining liquid quantity, and the switching means may comprises a three state logic IC.

Furthermore, in a remaining liquid quantity detecting device of the present invention may comprises an output circuit connected between the first voltage supplying means and the first electrode, the output circuit receives a signal representative of the remaining liquid quantity, the signal being generated based on an output signal outputted from the first voltage supplying means during the detection time and the resistance value corresponding to the remaining liquid quantity in the tank, and outputs a signal representative of the detected remaining liquid quantity.

The output circuit may comprise a comparator which a reference voltage is set in, and preferably the comparator outputs a pulse representative of the detected remaining liquid quantity when the remaining liquid quantity signal exceeds the reference voltage.

In the remaining liquid quantity detecting device of the present invention, the output circuit may comprise a level shift circuit, and the level shift circuit may shift a level of the detected remaining liquid quantity signal to almost 0V.

In another aspect of the present invention, a remaining liquid quantity detecting device for detecting a quantity of liquid remaining in a tank by applying a voltage to a pair of electrodes arranged in the tank and detecting electrolysis which changes under an influence of the liquid existing between the electrodes, wherein during a time of non-detecting the quantity of the remaining liquid, a standard voltage having a predetermined electric potential is applied to the electrodes, and during a time of detecting the quantity of the remaining liquid, an electric potential to be applied to one of the electrodes is made to alternatingly change on the basis of the standard voltage as a standard level.

In the remaining liquid quantity detecting device of the present invention, preferably, a mean value of an alternating voltage to be applied to one of the electrodes becomes almost equal to the standard voltage.

In the remaining liquid quantity detecting device of the present invention, a voltage is applied to a pair of electrodes arranged in a tank so that the heights thereof are different, and then the electric resistance which changes under the influence of the liquid existing between the electrodes is detected to thereby detect the quantity of the liquid remaining in the tank. In this device, even if a direct-current signal which may cause electrolysis and the like on the liquid is inputted, a standard voltage having a predetermined electric potential is applied to both electrodes during a non-detection time to thereby stop a current flowing between the electrodes and during a detection time an electric potential of one of the electrodes is changed to alternate on the basis of the standard voltage serving as a borderline, acting as if an alternating current flows between the electrodes, so that no negative power source is needed to generate an alternating signal and it can realize a remaining liquid quantity detecting device with a simple construction and in a low cost.

The remaining liquid quantity detecting device of the present invention will be influenced less by a current if it is constructed so that the mean value of a change in the voltage during a detecting time is almost equal to the standard voltage.

In the remaining liquid quantity detecting device of the present invention, the first voltage supplying means connected to the first electrode supplies a direct-current signal of a square waveform, sinusoidal waveform, or chopping waveform, and the second voltage supplying means connected to the second electrode applies an off-set voltage to the first electrode, thereby preventing the influence by the current flowing in the liquid such as electrolysis and the like.

In the remaining liquid quantity detecting device of the present invention, the signal having received a change in the resistance which changes according to whether the liquid exists in the tank or not is inputted to a comparator serving as an output circuit or a level shift circuit to output a predetermined detection signal therefrom.

In the remaining liquid quantity detecting device of the present invention, a voltage is applied to a pair of first and second electrodes arranged in a tank and the electric resistance changing under the influence of the liquid existing between the electrodes is detected to thereby detect the quantity of the liquid remaining in the tank. At this time, a direct-current signal of a square waveform, sinusoidal waveform, or chopping waveform is applied from the first voltage supplying means connected to the first electrode, but the first supplying means is put in a state where a current is stopped flowing therethrough during a non-detection time and the off-set voltage from the second voltage supplying means connected to the second electrode supplies a standard voltage having a predetermined electric potential to both electrodes. On the other hand, the first supplying means is put in a state where a current is allowed to flow therethrough during the time of detection, applying a direct-current signal to the first electrode and making the potential between both electrodes to alternate on the basis of the standard voltage as a borderline, so that it acts as if an alternating current flows between the electrodes in the liquid. This prevents the influence of an electric current such as electrolysis and the like on the liquid accordingly.

In the remaining liquid quantity detecting device of the present invention, the three state logic of the first voltage supplying means controls a current to flow or not therethrough, thereby generating a timing of detection or non-detection.

In the present invention, to detect the quantity of the liquid remaining in a tank is made by applying a voltage to a pair of electrodes in the tank and detecting the electric resistance which will change according to whether liquid exists between the electrodes, in which a standard voltage having a predetermined electric potential is applied to the both electrodes during a non-detecting time, and, during the time of detecting the quantity of the remaining liquid, the electric potential of one of the electrodes is controlled to alternate on the basis of the standard voltage as a borderline. As a result, it is possible to provide an inexpensive remaining liquid quantity detecting device capable of preventing the influence of electrolysis and the like on liquid.

According to the present invention, the remaining liquid quantity detecting device is constructed so that to one of a pari of electrodes set in a tank is connected the first voltage supplying means to apply a direct-current signal of a square waveform, sinusoidal waveform, or chopping waveform, and to another electrode is connected the second voltage supplying means to apply an off-set voltage. This results in preventing of the influence of the electrolysis and the like on the liquid and lowering of cost of the device itself.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

A detailed description of preferred embodiments of a remaining liquid quantity detecting device embodying the present invention will now be given referring to the accompanying drawings.

Figure 1:
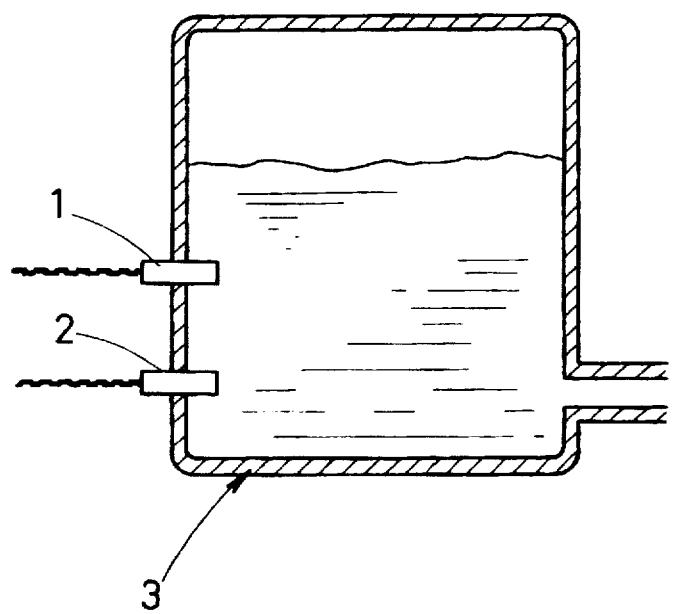
FIG. 1 is a cross-sectional view of an ink tank in which arranged is a remaining liquid quantity detecting device according to the present invention.
Figure 2:
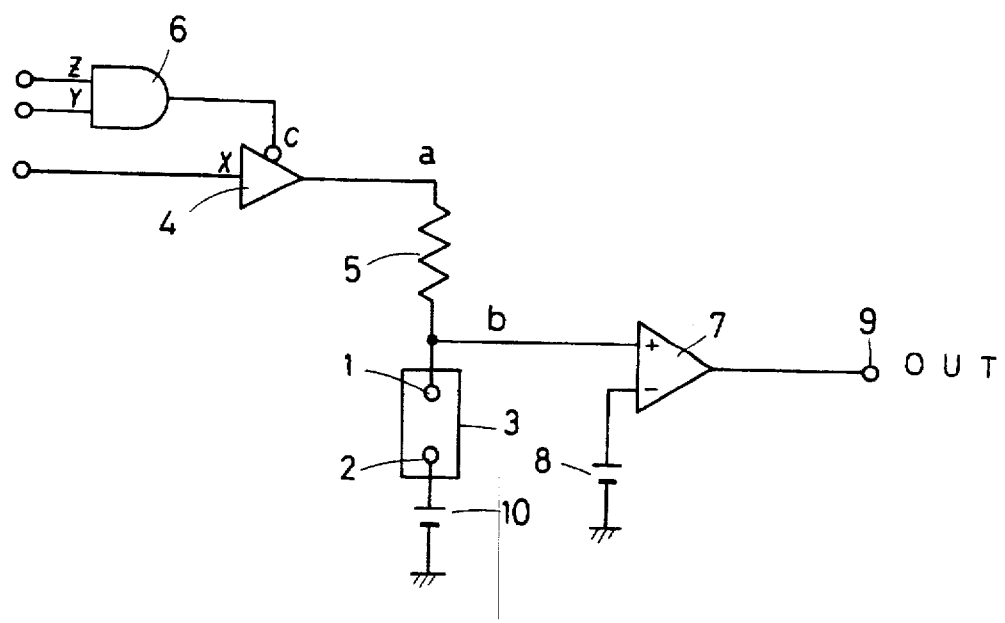
FIG. 2 is a circuit diagram showing a first embodiment of the remaining liquid quantity detecting device according to the present invention.

FIG. 1 is a schematic sectional view of an ink tank which the ink to be detected is filled in. FIG. 2 is a circuit diagram of the remaining liquid quantity detecting device in the first embodiment.

As shown in FIG. 1, an ink tank 3 is fixedly provided with a pair of electrodes, i.e., a first electrode 1 and a second electrode 2, so that the heights thereof are made different. These electrodes 1 and 2 fixed in the ink tank 3 are constructed so as to have the circuit shown in FIG. 2.

To the first electrode 1, an output terminal of a three state logic IC 4 is connected through a detection resistance 5. To a control terminal C of the three state logic 4 is connected an output terminal of a NAND gate 6. A first voltage supplying means is constructed of those three state logic IC 4, the detection resistance 5, the NAND gate 6, and a signal transmission circuit not shown which inputs a square waveform signal of direct current to the input terminal of the three state logic IC 4.

The first electrode 1 is also connected with a positive side input terminal of a comparator 7. In the comparator 7, a negative side input terminal thereof is applied with a reference voltage 8 and an output terminal thereof is connected to an output port 9 to output pulse signals representing the result of the quantity of the ink remaining in the ink tank 3.

On the other hand, the second electrode 2 in the ink tank 3 is connected with an off-set voltage 10 serving as a second voltage supplying means to put the voltage to the second electrode 2 into 2.5V.

With the remaining liquid quantity detecting device constructed as above, to detect the quantity of the ink quantity remaining in the ink tank 3 is performed as follows. FIG. 3(A) through FIG. 3(D) are time chart diagrams showing electric potentials (signals) at each point in the circuit constructing the liquid quantity detecting device.

Figure 3A:
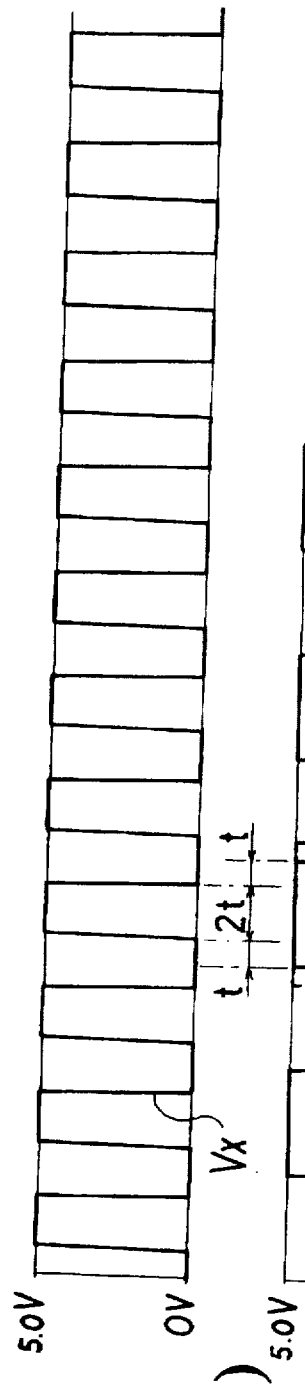
FIGS. 3(A)–(D) is a time chart showing an electric potential (signal) at each point in a circuit constructing the remaining liquid quantity detecting device of the first embodiment.
Figure 3B:
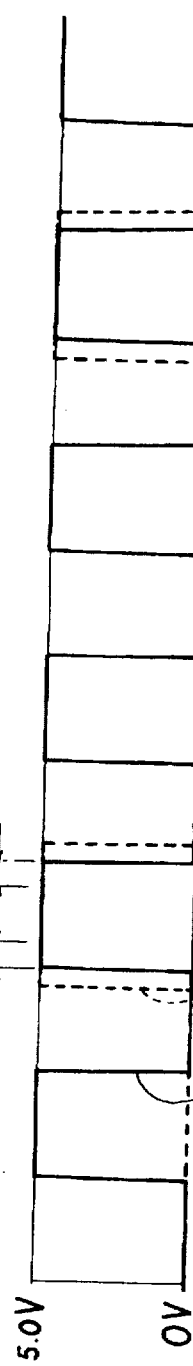

FIG. 3(A) shows input signal Vx which is a square waveform signal of a direct-current to the inputted terminal X of the three state logic IC 4, where H level indicates 5V and L level indicates 0V, respectively. The input signal inputted to the NAND gate 6, mentioned later, has a similar level thereto. FIG. 3(B) shows the input signal Vy illustrated by a solid line and the input signal Vz illustrated by a dotted line, which are inputted to the input terminal Y and Z of the NAND gate 6, respectively. The input signal Vz is a timing pulse which rises at predetermined intervals at detecting the quantity of the remainder of ink.

The input sinal Vx of the three state logic IC 4 reverses at intervals of 2t, and the input signal Vy reverses at intervals of 4t. The input signal Vy is applied so that its H level is concurrent with the H level of the input signal Vx at the time from 2t to 3t.

Figure 3C:
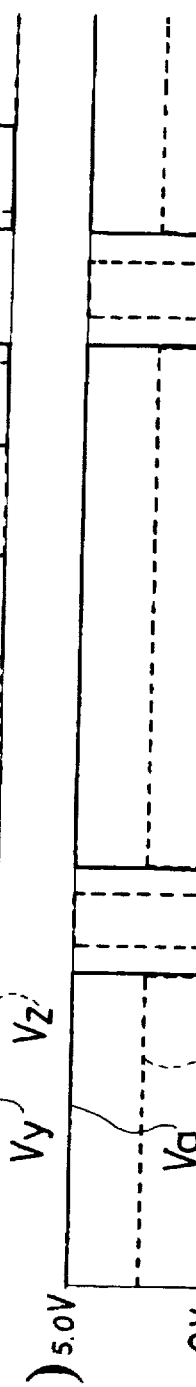
Figure 3D:
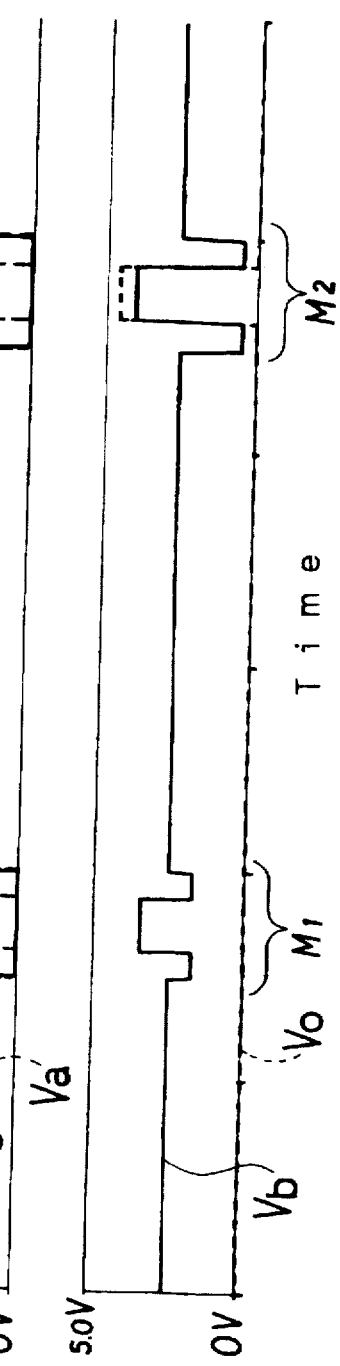

On the other hand, the input signal Vz is inputted so that its H level signal is inputted longer than those of the input signals Vx and Vy, namely, for the times shown by M1 and M2 in FIG. 3(D) and also is surely inputted concurrently with the H level of the input signal Vy. In this input signal Vz, the period of H level signal indicates a detecting time and the L level signal indicates a non-detecting time.

FIG. 3(C) shows an output signal Vg illustrated by a solid line of the NAND gate 6 and an output voltage Va illustrated by a dotted line of the three state logic IC 4. When the input signal Vz is applied in its H level during the detection time, both input signals Vy and Vz become concurrently in their H level, so that the output signal Vg becomes L level.

Meanwhile, when the input signal Vg inputted to the control terminal C is in its L level, the three state logic IC 4 outputs the input signal from the input terminal as it is. When the input signal to the control terminal C is in its H level, the output terminal of the three state logic IC 4 is put into a state separate from an internal circuit thereof. Accordingly, in case the output signal Vg is inputted in its L level to the control terminal C, the three state logic IC 4 outputs the input signal Vx inputted from the input terminal X.

In case that the output signal Vg is in its H level, the three state logic IC 4 is disconnected as mentioned above, as a result, a current ceases flowing therethrough. At this time, the output voltage Va indicates 2.5V (hereinafter defined as a standard voltage) which is almost equal to the level of the off-set voltage 10. When the output signal Vg applied is in its L level, the input signal Vx is outputted from the three state logic IC 4 and thereby the electric potential of the output voltage Va changes as shown in the figure.

FIG. 3(D) shows an input voltage Vb to be inputted to a plus terminal of the comparator 7, indicating a voltage level between the detection resistance 5 and the first electrode 1. This voltage Vb also indicates the standard voltage; 2.5V which is almost equal to the level of the off-set voltage 10 when the three state logic IC 4 is in a disconnected state, no current flowing therethrough. When the output signal Vg becomes L level, the voltage Vb changes in response to the input signal Vx from the three state logic 4.

It is therefore remarked below about the output voltage Va and the input voltage Vb during the time M1 when ink is filled between the first and second electrodes in the ink tank 3. When the input signal Vx is inputted in its L level to the three state logic IC 4, the electric potential of the off-set voltage 10 side increases, so that the output voltage Va becomes lower as compared with the standard voltage; 2.5V and also the input voltage Vb becomes L level due to the potential drop under the resistance of the ink.

To the contrary, in case that the input signal Vx is inputted in its H level, the electric potential of the off-set voltage 10 is made small, resulting in that the output voltage Va and the input voltage Vb both become H level compared with the standard voltage; 2.5V.

Therefore, when the output voltage Va reduced to its L level, a current flows from the second electrode 2 connected with the off-set voltage 10 which is set to 2.5V to the first electrode 1, and when the output voltage Va becomes its H level, to the contrary, a current flows from the first electrode 1 to the second electrode 2. This substantially acts as if an alternating current flows between both electrodes 1 and 2.

At this time, the mean value of the output voltage Va changing alternatingly as mentioned above becomes almost equal to the standard voltage. The ink in the ink tank 1 is hardly affected by electric current, making it possible to effectively prevent the characteristic deterioration.

The time M2 in the figure indicates a case where ink is not filled between the first and second electrodes 1 and 2 in the ink tank 3. In this case, a partial pressure ratio with respect to the detection resistance 5 increases because the resistance between the first and second electrodes 1 and 2 varies according to whether ink exists between both electrodes 1 and 2 or not. At that time, the output voltage Va changes as well as in the time M1, and the input voltage Vb largely changes as shown in the figure.

Accordingly, even in this time M2, an alternating current substantially flows between both electrodes 1 and 2.

At this time, as shown in FIG. 3(D), the output voltage Vo presented by a dotted line from the comparator 7 is supplied in its H level by comparing the input voltage Vb during the time M2 with the reference voltage 8. Based on the H level signal during the time M2, it is detected that the quantity of the remainder of ink in the ink tank 1 is reduced.

As mentioned above, in the remaining liquid quantity detecting device according to the present embodiment, the first electrode 1 is connected to the three state logic IC 4, and the second electrode 2 is connected to the off-set voltage 10, and applied with a voltage of 2.5V, so that even if the square waveform signal inputted to the three state logic IC 4 is a direct-current signal, it is possible to prevent the occurrence of the characteristic deterioration of ink.

Specifically, as shown in the waveform of the output voltage Va, there is no potential difference between both electrodes 1 and 2 during the non-detection time, thus no current flowing therebetween, whereas the electric potential applied to both electrodes 1 and 2 during the detection time changes up and down on the basis of a standard voltage, 2.5V. Thus, it substantially operates as if an alternating current flows between both electrodes 1 and 2 during the time of detecting the quantity of the remainder of ink. Accordingly, although a direct-current signal is inputted to detect the quantity of the remaining ink, it is possible to prevent the occurrence of the characteristic deterioration of ink and the like. It is therefore possible to provide an inexpensive remaining liquid quantity detecting device without needing a negative power source to generate an alternating current signal.

Figure 4:
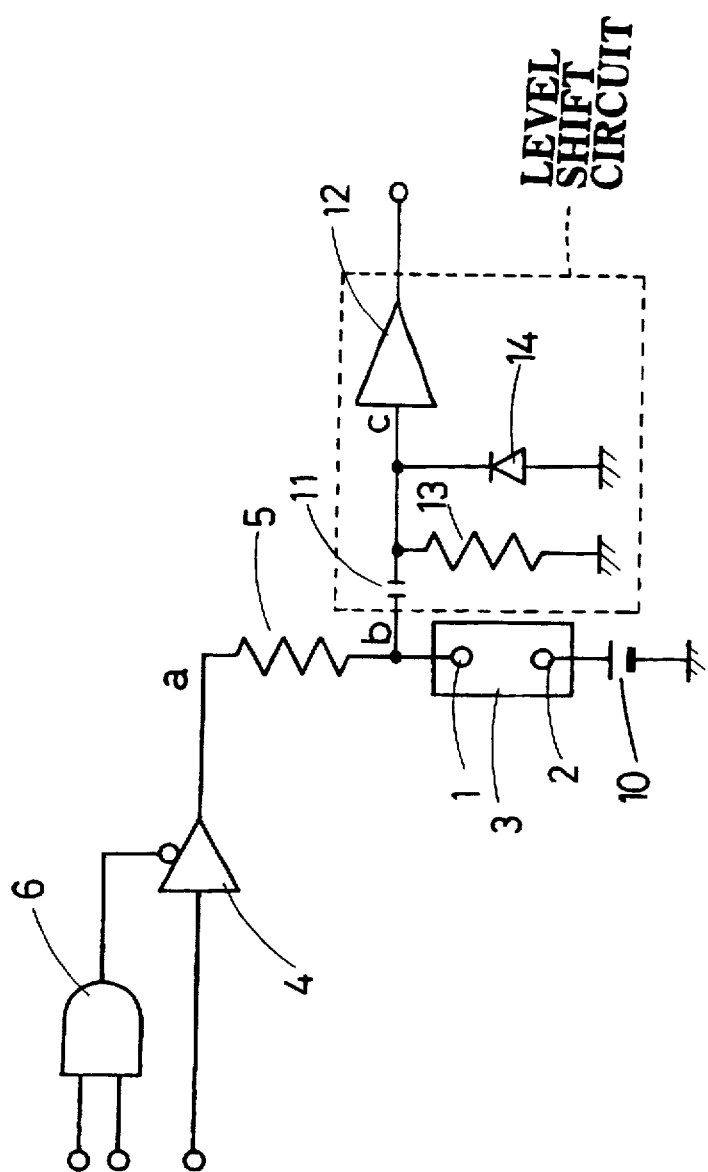
FIG. 4 is a circuit diagram of showing a second embodiment of the remaining liquid quantity detecting device according to the present invention.

Next, the second embodiment of the remaining liquid quantity detecting device will be explained in reference to following figures. FIG. 4 is a circuit diagram of the remaining liquid quantity detecting device in the second embodiment, more specifically, an example of changing the comparator 7 in the first embodiment are provided with the same codes and each explanation thereof is omitted.

In this embodiment, instead of the comparator 7 in the first embodiment, a level shift circuit is formed. In detail, a logic IC 12 is connected through a condenser 11 between the first electrode 1 and the detection resistance 5. Between the condenser 11 and the logic IC 12, a resistance 13 and a diode 14 are connected in parallel, both which are grounded.

Figure 5:
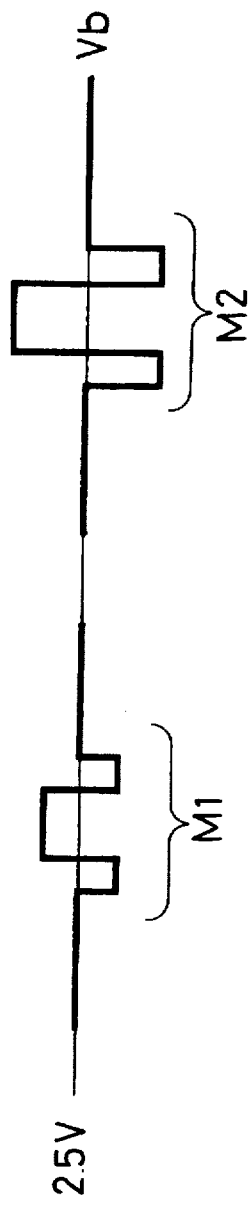
FIGS. 5(A)–(B) is a time chart showing a shifting state of waveforms in a level shift circuit.
Figure 5:
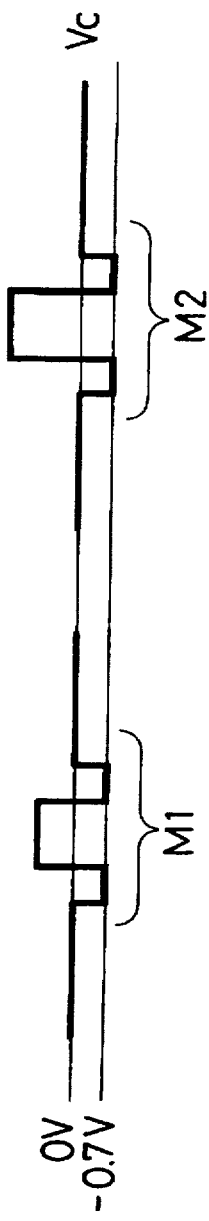

In the above-mentioned circuit, the input voltage Vb occurring between the first electrode 1 and the detection resistance 5, as shown in FIG. 5(A), becomes a signal alternating on the basis of 2.5V during the times M1 and M2 as well as the input voltage Vb mentioned above (see FIG. 3(D)). Based on the operation in the level shift circuit, the input voltage Vb is shifted its L level to almost 0V, thereby becomes the input voltage Vc as shown in FIG. 5(B). Here, corresponding to the quantity of backward voltage (0.7V) of the diode 14 provided in the level shift circuit, the input voltage Vc becomes a signal alternating on the basis of 0V during the detection times M1 and M2, further the amplitude to the minus side in the signal becomes −0.7V. The level-shifted input voltage Vc is inputted to the logic IC 12. The voltage value of the input voltage Vc in H level can be regulated by changing the resistance 5.

In the remaining liquid quantity detecting device constructed above in the second embodiment, similarly to in the first embodiment, the input voltage Vb changes in accordance of the change of the resistance according to whether ink exists between the first and second electrodes 1 and 2. The input voltage Vb is shifted its level to almost 0V through the level shift circuit and becomes the input voltage Vc. This input signal Vc is then inputted to the logic IC 12.

According to the H level state of the input voltage Vc, i.e., when the input voltage Vc exceeds a predetermined voltage level (in the case of the time M2), the logic IC 12 outputs a pulse signal to detect the remainder of ink (or a pulse signal in H level in the case where the remainder of ink has been used up during the time M2).

According to the remaining liquid quantity detecting device in the second embodiment, the output voltage Va outputted from the three state logic IC 4 changes as well as in the first embodiment; therefore, no potential difference occurs between both electrodes 1 and 2 during the non-detection time, thus no current flowing therebetween. To the contrary, the electric potential applied to both electrodes 1 and 2 during the detection times M1 and M2 alternates on the basis of 2.5V. Thus, it operates as if an alternating current substantially flows between both electrodes 1 and 2 during the times M1 and M2 for detecting the remainder of ink. Accordingly, although a direct-current signal is inputted to detect the quantity of the remaining ink, it is possible to surely prevent the occurrence of the characteristic deterioration of ink. It is therefore possible to realize an inexpensive device for detecting the quantity of the remaining liquid without needing a negative power source to generate an alternating signal.

The present invention may be embodied in other specific forms without departing from the spirit or essential characteristics thereof. For instance, signals do not have to be outputted at the intervals mentioned above and may be changed according to conditions. In particular, to avoid the influence of electric current to ink, e.g., the electrolysis of ink, it is preferable that currents flowing in both electrodes during the detection time is equal in electric power, so that changing the interval of outputting signals is also often needed to regulate the electric power.

In the above embodiments, detecting the quantity of the remaining ink has been explained. The liquid to be detected is not limited to ink and may include all liquid in which inconvenience like electrolysis and the like might occur.

Furthermore, in the above embodiments, a square waveform is used for the direct-current input signal Vx and, instead thereof, a sinusoidal waveform and a chopping waveform may be used.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A remaining liquid quantity detecting device for detecting a quantity of liquid remaining in a tank by applying a voltage to a pair of electrodes arranged in the tank and detecting electrolysis which changes under an influence of the liquid existing between the electrodes, the device comprising:

a first voltage supplying means, connected to said first electrode, for applying a direct-current signal to the first electrode;

a switching means, provided in said first voltage supplying means, for switching the same between a first mode incapable of applying a current-signal to the first electrode and a second mode capable of applying a current-signal to the first electrode; and a second voltage supplying means, connected to the second electrode, for applying a predetermined standard voltage to the first electrode, wherein during a time of non-detecting the quantity of the remaining liquid, the first voltage supplying means is set in the first mode through the switching means and a standard voltage is applied to the first and second electrodes based on the second voltage supplying means, and during a time of detecting the quantity of the remaining liquid, the first voltage supplying means is set in the second mode through the switching means and an electric potential of the first electrode is made to change alternatingly on the basis of the standard voltage based on the first and second voltage supplying means.

2. A remaining liquid quantity detecting device according to claim 1, wherein said direct-current signal is a square waveform.

3. A remaining liquid quantity detecting device according to claim 2, wherein said switching means sets the first voltage supplying means in the first mode based on a timing of detecting the remaining liquid quantity.

4. A remaining liquid quantity detecting device according to claim 3, wherein said switching means comprises a three state logic IC.

5. A remaining liquid quantity detecting device according to claim 1, further comprising an output circuit connected between said first voltage supplying means and said first electrode, said output circuit receives a signal representative of the remaining liquid quantity, the signal being generated based on an output signal outputted from the first voltage supplying means during the detection time and the resistance value corresponding to the remaining liquid quantity in the tank, and outputs a signal representative of the detected remaining liquid quantity.

6. A remaining liquid quantity detecting device according to claim 5, wherein said output circuit comprises a comparator which a reference voltage is set in.

7. A remaining liquid quantity detecting device according to claim 6, wherein said comparator outputs a pulse representative of the detected remaining liquid quantity when said remaining liquid quantity signal exceeds the reference voltage.

8. A remaining liquid quantity detecting device according to claim 5, wherein said output circuit comprises a level shift circuit.

9. A remaining liquid quantity detecting device according to claim 8, wherein said level shift circuit shifts a level of the detected remaining liquid quantity signal to almost 0V.

10. A remaining liquid quantity detecting device for detecting a quantity of liquid remaining in a tank by applying a voltage to a pair of electrodes arranged in the tank and detecting electrolysis which changes under an influence of the liquid existing between the electrodes, wherein during a time of non-detecting the quantity of the remaining liquid, a standard voltage having a predetermined electric potential is applied to said electrodes, and during a time of detecting the quantity of the remaining liquid, an electric potential to be applied to one of the electrodes is made to alternatingly change on the basis of said standard voltage as a standard level.

11. A remaining liquid quantity detecting device according to claim 10, wherein a mean value of an alternating voltage to be applied to one of said electrodes becomes almost equal to the standard voltage.

* * * * *